United States Patent [19]

Warren

[11] 4,345,382
[45] Aug. 24, 1982

[54] CONTRACTOR'S GRADE ROD APPARATUS AND PROCEDURE FOR SETTING AND CHECKING GRADES

[76] Inventor: Dwight D. Warren, Rte. 2, Box 155A, Scott Loop Rd., Mobile, Ala. 36609

[21] Appl. No.: 121,064

[22] Filed: Feb. 13, 1980

[51] Int. Cl.³ .................. G01C 15/02; G01C 15/06
[52] U.S. Cl. .................................. 33/294; 33/296
[58] Field of Search .................. 33/293, 294, 295, 296

[56] References Cited

U.S. PATENT DOCUMENTS

| | | | |
|---|---|---|---|
| 269,254 | 12/1982 | Bean | 33/294 |
| 311,221 | 1/1885 | Bean | |
| 826,246 | 7/1906 | Halversen | |
| 1,165,820 | 12/1915 | Watson | |
| 3,460,260 | 8/1969 | Sarlandt | |
| 3,487,550 | 1/1970 | Herman et al. | |
| 4,060,909 | 12/1977 | Collins et al. | 33/296 |

*Primary Examiner*—Steven L. Stephan
*Attorney, Agent, or Firm*—James A. Wong

[57] ABSTRACT

Apparatus for use in setting and checking grades in construction of roads, parking lots, building, or the like comprising a level support in combination with a level rod wherein the level support has a nominal length of X plus Y, for example, the level rod includes a zero mark above which are plus (+) graduations in terms of a principal dimension and a subordinate dimension below which are minus (−) graduations in terms of the principal and subordinate dimensions down to a length of X according to the principal dimension and a leg member adustably secured to the rod, the leg member having a foot portion extending below the lower end of the rod, the leg member being adjustable so that the foot portion may be selectively set to extend below the lower end of the rod for a minimum distance of Y according to the subordinate dimension or more as desired, whereby the zero mark may be selectively set at a distance equal to the nominal length of X plus Y above the lower end of the foot portion so that in use of the apparatus the zero mark of the level rod corresponds to the height of the level support.

5 Claims, 8 Drawing Figures

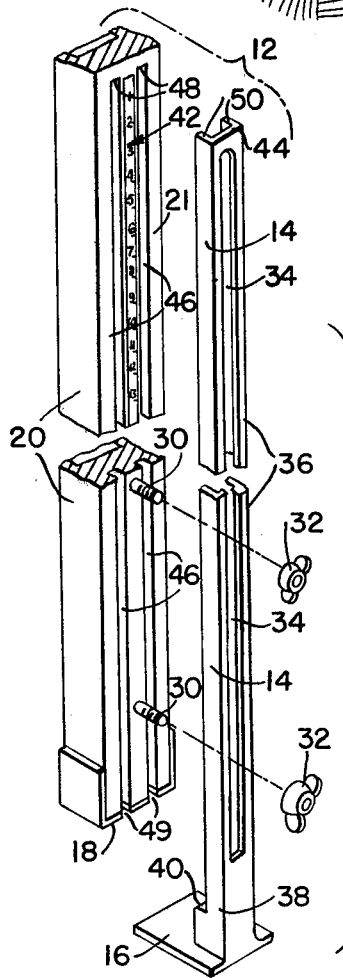
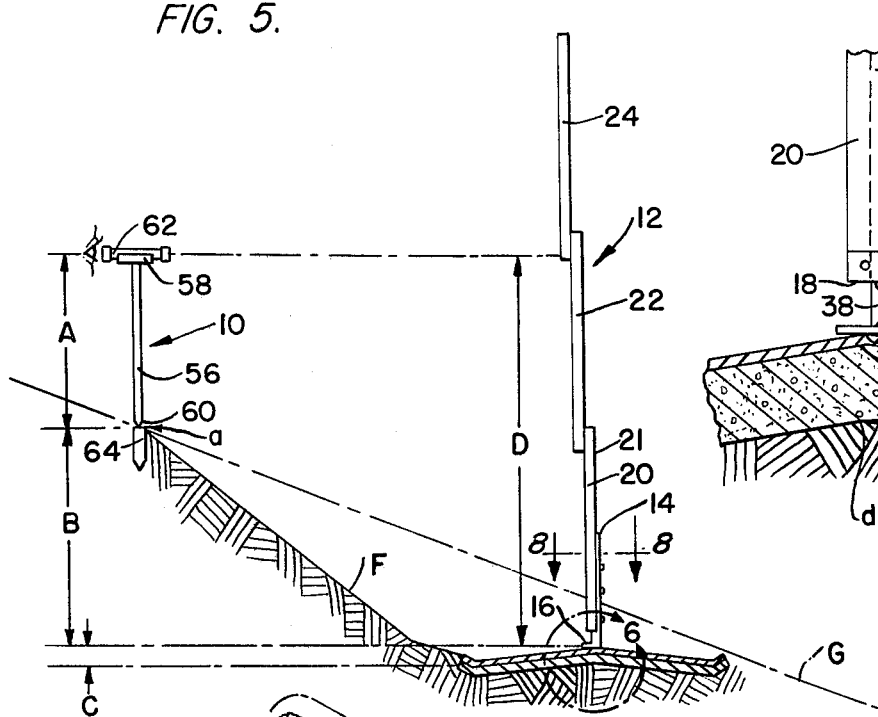
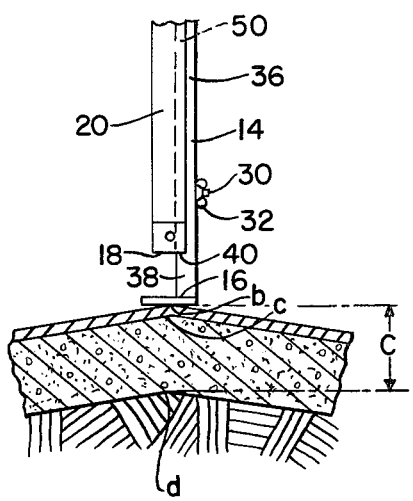
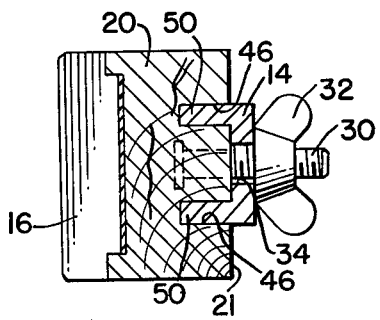

CONTRACTOR'S GRADE ROD APPARATUS AND PROCEDURE FOR SETTING AND CHECKING GRADES

BACKGROUND OF THE INVENTION

In the construction of roads, parking lots, buildings, or the like, the task of checking and/or setting grade is performed with a level rod, a hand level, a level support, and a cut sheet providing data supplied by the responsible engineer. With the available equipment, several calculations must be made in checking and/or setting grade so that higher pay personnel must be available to direct or make the necessary calculations than the lower pay construction crew members.

SUMMARY OF THE INVENTION

The present invention relates to a new and improved apparatus and procedure for setting and checking grades in construction of roads, parking lots, buildings, or the like.

OBJECTS OF THE INVENTION

Consistent with the summary of the invention set forth above, it is an object of the present invention to provide a new and efficacious apparatus with which construction personnel in the field may accurately and with ease set and check grades during construction of roads, parking lots, buildings, and the like.

It is another object of this invention to provide a new and improved apparatus with which direct readings may be taken to set and check grades without calculations.

It is a further object of this invention to provide a new and improved procedure by which to set and check grades, one which is simpler than the procedures known to be in use and will require no calculation.

BRIEF DESCRIPTION OF THE DRAWINGS

The objects and advantages of the present invention will be readily understood by the reader upon referring to the appended drawings in which:

FIG. 5 is a side elevational view of the level rod and level support of FIGS. 1 and 4 in operational position;

FIG. 6 is an enlarged fragmentary view of the portion encircled by dot and dash lines at 6 in FIG. 5;

FIG. 7 is an exploded fragmentary view in perspective and on an enlarged scale of lower section of the level rod looking from the rear of such lower section; and FIG. 8 is a view on an enlarged scale taken along section 8—8 and looking in the direction of the arrows associated therewith in FIG. 5.

DETAILED DESCRIPTION OF THE INVENTION

Figure 1:
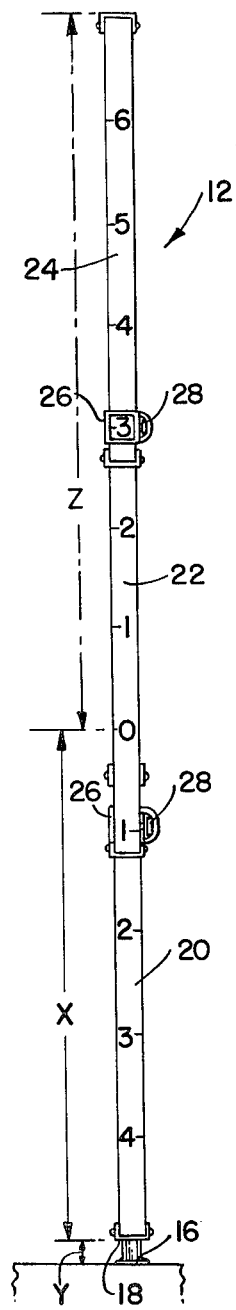
FIG. 1 is a front elevational view of the level rod forming part of the disclosed invention.
Figure 2:
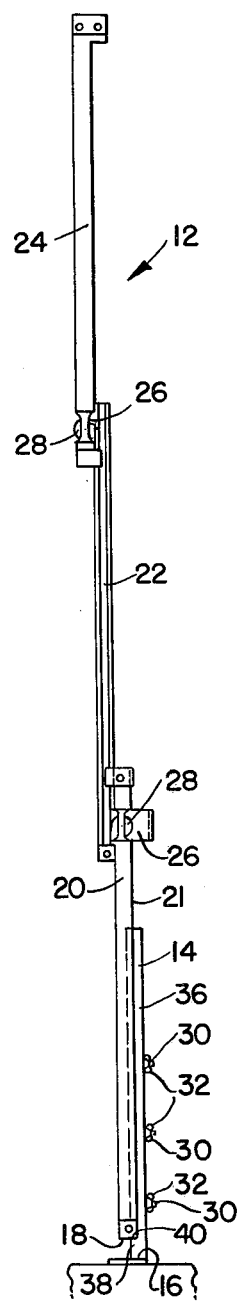
FIG. 2 is a side elevational view of the level rod illustrated in FIG. 1.
Figure 3:
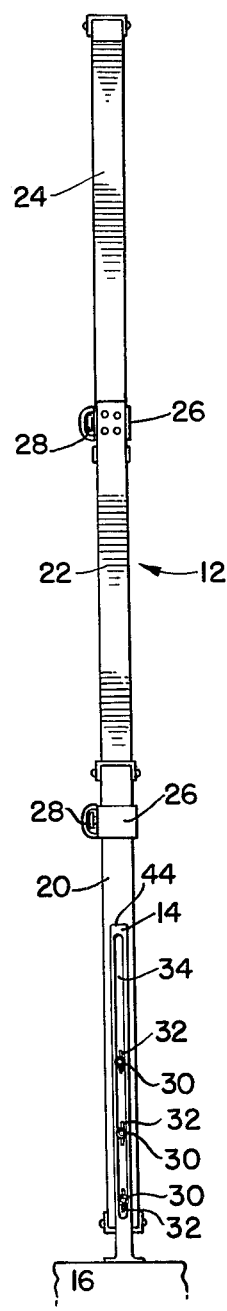
FIG. 3 is a rear elevational view of the level rod illustrated in FIGS. 1 and 2.

Referring now in detail to the drawing concurrently filed herewith, the reader will readily appreciate that the inventive concept disclosed herein relates to an apparatus and/or procedure of using such an apparatus for use in setting and checking grades in construction of roads, parking lots, buildings, or the like wherein such an apparatus comprises a level support 10 in combination with a level rod 12 as illustrated in FIG. 5. As may best be seen in FIGS. 1-3, level rod 12, as disclosed, has a nominal length of X plus Y, plus Z, for example, the level rod 12 includes a zero mark above which are plus (+) graduations in terms of a principal dimension and a subordinate dimension and below which are minus (−) graduations in terms of the principal and subordinate dimensions down to a length of X. According to the invention, a leg member 14 is adjustably secured to level rod 12, with such leg member 14 having a foot portion 16 extending below the lower end of level rod 12 wherein such leg member 14 is adjustable so that the foot portion 16 may be selectively set so as to extend below the lower end 18 of the rod 12 for a minimum distance of Y or more as desired, whereby the zero mark may be selectively set at a distance equal to the nominal length of X plus Y above the lower end of foot portion 16 so that in use of the apparatus the zero mark of the level rod 12 corresponds to the elevation or height of level support 10. Level rod 12 may also be seen in FIGS. 1-3 and 5 to include a plurality of selectively adjustable sections 20, 22, 24 releasably secured to an adjacent one of such sections 20, 22, 24 by brackets 26 with thumbscrews 28. As may be understood from FIGS. 5-8, a plurality of threaded studs 30 extend from the back surface 21 of the lowest section 20 through an elongate slot 34 in leg member in threaded relationship with threaded nuts 32 which releasably secure leg member 14 and section 20 together. As described, the sections 20, 22, 24 are selectively adjustable to vary the height or length of level rod 12 and section 20 and leg member 14 are selectively adjustable to vary the elevation or height of section 20 or level rod 12 with respect to leg member 14. Elongate slot 34 through which studs 30 extend facilitate sliding relationship therebetween when threaded nuts 32 are loosened. Leg member 14 may further be understood to comprise a relatively narrow elongate segment 36 in contact with back surface 21 of lowest one of sections 20, and a relatively wide short segment 38 at the lower end thereof extending down to foot portion 16, relatively wide short segment 38 having a generally horizontal abutment 40 to limit upward adjustment of leg member 14 with respect to lowest one of sections 20 whereby foot portion 16 will be below the lower end of the lowest one of section 20 by a distance Y. Back surface 21 includes a scale 42 with vertically spaced graduations in inches, for example, of downwardly increasing magnitude and leg member 14 includes indicia means in the form of an edge 44 to show the amount by which leg member 14 and the lowest one of sections 20 are extended with respect to each other. The principal and subordinate dimensions on the front of sections 20, 22, 24 may be in terms of feet and inches, respectively. Alternatively, the scale 42 on back surface 21 of section 20 may be in centimeters while the principal and subordinate dimensions on the front of sections 20, 22, 24 may be in terms of meters and centimeters, respectively. As may be seen in FIGS. 7 and 8, there is a pair of parallel grooves 46 on the back surface of section 20. Each of these grooves 46 extend upwardly from opening 49 at the lower end of sections 20 to terminate at a blind end 48 adjacent the upper end of section 20. Leg member 14 has a channel cross-section with elongate flanges 50, which in assembled condition are disposed in grooves 46, but may be in sliding movement therein when nuts 32 are loosened on studs 30.

Figure 4:
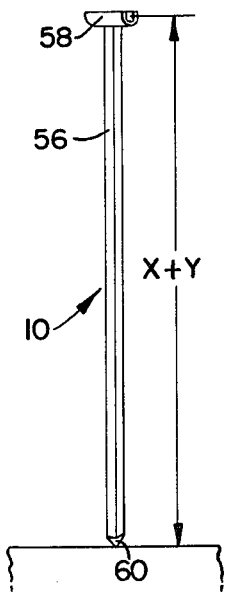
FIG. 4 is an elevational view of the level support forming another part of the disclosed invention.

Considering FIGS. 4 and 5, the reader will understand that level support 10 comprises a shaft portion 56, a cradle 58, and a downwardly directed tip 60. As seen in FIG. 5, a hand level 62 is supported in cradle 58 for use in setting or checking grades in accordance with the disclosed invention.

The level rod 12 and matching hand level support 10 according to the inventive concept are intended for use by contractors and others for setting and checking grades during construction of roads, parking lots, buildings, and the like.

For illustrative purposes, a typical road cut section is shown in FIG. 5. The contractor would be responsible for building the road to a previously established elevation point b through which the center line of level rod 12 may be passed as illustrated in FIG. 6. In order to accomplish the foregoing, the contractor is normally furnished an offset hub 64 usually located on or near the road right-of-way. The engineer establishes an elevation at the top of this hub 64 and furnishes the contractor with a cut sheet which gives the vertical difference between the top of hub 64 and point b, or distance B.

The contractor may with this information, a hand level and a conventional level rod construct the road. However, with the equipment existing prior to the disclosed apparatus, the contractor must make several calculations each time grade is set or checked. These calculations are required because of several factors, including the following:

1. A conventional level rod as used by surveyors and engineers is graduated in feet, tenths, and hundredths, beginning at the bottom of the rod and progressing to the top;

2. Contractors normally have no standard hand level support and use whatever is available such as a guard stake or straight stick or limb; and 3. Although, the cut sheet addresses itself to Finish Grade point b, the contractor is normally working to subgrade point d or top of base point c.

A typical set of calculations required to check or set subgrade point d might be as follows:

Assumptions:

1. Cut sheet gives the cut, or elevation difference between top of hub 64, otherwise designated as point a for purposes of calculations, and point b, as 4.02 feet the distance B;

2. The pavement structure is 9¼" from point b to point d (distance C); and

3. The contractor has selected a straight stick of length 5'-7" as a hand level support (distance A).

The contractor must calculate the rod reading required (distance D+distance C) as follows:

$$D = A + B = (5 + 7/12)' + (4.02)' = 5.58 + 4.02 = 9.60 \text{ feet}$$
$$C = (9\tfrac{1}{4})/12" = 0.78 \text{ feet}$$
$$10.38 \text{ feet}$$

The rod reading required for the subgrade to be at the proper elevation would then be 10.38 feet.

This type of calculation must be repeated many times daily during construction of a roadway. Although it would be ideal for this to be accomplished by the less skilled personnel of the contractor, the calculations dictate that a higher pay, more skilled worker must be present to perform this operation.

The above problems are addressed and resolved by the contractors level rod 12 taken in conjunction with the hand level support 10 in the following manner:

1. The contractors level rod 12, for example, is graduated in feet, tenths, and hundredths with zero set at 5'2", the height of the hand level support 10. The numbers indicating principal and subordinate dimensions on level rod 12 progress in both directions from zero. The portion above zero is for cut sections that is road lower than hub 64 while the portion below zero is for fill sections or road higher than hub 64. Rod 12 is clearly marked to facilitate reading of both sections;

2. The hand level support 10 is matched to the contractors level rod 12, so that the height of the support 10 at 5'2"± matches zero mark on the rod 12; and 3. Adjustable leg 14 is provided on the bottom of the rod 12 with a scale in feet, inches, half quarters, eighths, and sixteenths inches.

Thus, the grade set or checked with equipment existing prior to the invention of the instant application as discussed above may now be set or checked with the apparatus disclosed herein without calculations for the following reasons:

1. The height of hand level support 10 and zero mark of level rod 12 are matched as discussed above;

2. The distance C or 9¼" would be accounted for by lowering the leg 9¼" below the rod and locking it in place, which distance C is normally uniform for a given job and should need setting only once for each job; and 3. The distance B or cut would be read directly on the upper or cut section of rod 12.

With the disclosed apparatus, the contractor may work directly from the furnished cut sheet and no calculations would be involved.

It may be further understood that the pavement structure C is usually uniform for a given job and would only need to be set at the beginning of the job. However, to change to another job or point in the pavement structure would be a simple matter of adjusting the leg 14 to effect matching edge 44 on level rod 12 with the desired pavement structure thickness on scale 42.

With the apparatus described above, a method is provided for setting and checking grades in construction of roads, parking lots, buildings, or the like comprising the steps of locating a level support 10 of predetermined length at an established location 64 of predetermined elevation; placing a level rod 12 with an adjustable base or leg 14 and having a zero mark with plus (+) graduations above the zero mark and minus (−) graduations below the zero mark at another location b to set and check a grade; setting of pavement structure thickness by adjusting the base 14 as necessary to match edge 44 with desired thickness on scale 42; and taking a direct reading on the level rod 12 from the level support 10 to thereby set and check the grade between the locations involved.

In FIG. 5, line G represents the existing ground line prior to construction and line F represents the finished grade.

Application of these principles to lightweight fiberglass level rods or adjustable face level rods are considered to be within the scope of this invention.

It will be obvious to those skilled in the art that various changes may be made without departing from the scope of the invention and the invention is not to be considered limited to what is shown in the drawings and described in the specification.

What is claimed is:

1. Apparatus for use in setting and checking grades in construction of roads, parking lots, buildings, or the like comprising a level support in combination with a level rod wherein said level support has a nominal length of X plus Y, for example, said level rod includes a zero mark above which are plus (+) graduations in terms of a principal dimension and a subordinate dimension and below which are minus (−) graduations in terms of said principal and subordinate dimensions down to a length of X and a leg member adjustably secured to said rod, said leg member having a foot portion extending below the lower end of said rod, said leg member being adjustable so that said foot portion may be selectively set to extend below the lower end of said rod for a minimum distance of Y or more as desired, whereby said zero mark may be selectively set at a distance equal to the nominal length of X plus Y above the lower end of said foot portion so that in use of said apparatus the zero mark of said level rod corresponds to the height of said level support;

said level rod also includes a plurality of selectively adjustable sections and means for releasably securing each of said sections to another of said sections adjacent thereto and means for releasably securing said leg member to the lowest one of said sections when said level rod is held in generally vertical position for use;

said lowest one of said sections having said graduations on a front surface with a back surface behind said front surface wherein said means for releasably securing said leg member comprise a plurality of fixed threaded studs extending from said back surface and nuts threaded on said studs, and said leg member is provided with an elongate slot through which said studs extend to facilitate sliding adjustment between said leg member and said lowest one of said sections when said nuts are loosened on said threaded studs;

said leg member comprises a relatively narrow elongate segment in contact with said back surface of said lowest one of said sections, and a relatively wide short segment at the longer end thereof extending down to said foot portion, said relatively wide short segment having a generally horizontal abutment to limit upward adjustment of said leg member with respect to said lowest one of said sections whereby said foot portion will be below the lower end of said lowest one of said section by a distance Y;

said back surface is provided with vertical graduations in inches of downwardly increasing magnitude and said leg member includes indicia means to show the amount by which said leg member and said lowest one of said sections are extended with respect to each other, and said principal and subordinate dimensions are in terms of feet and inches, respectively; and said lowest one of said sections comprises a pair of parallel grooves on said back surface, each of said grooves extending upwardly from the lower end of said lowest one of said sections to terminate at a blind end adjacent the upper end of said lowest one of said sections.

2. Apparatus for use in setting and checking grades in construction of roads, parking lots, buildings, or the like comprising a level support in combination with a level rod wherein said level support has a nominal length of X plus Y, for example, said level rod includes a zero mark above which are plus (+) graduations in terms of a principal dimension and a subordinate dimension and below which are minus (−) graduations in terms of said principal and subordinate dimensions down to a length of X and a leg member adjustably secured to said rod, said leg member having a foot portion extending below the lower end of said rod, said leg member being adjustable so that said foot portion may be selectively set to extend below the lower end of said rod for a minimum distance of Y or more as desired, whereby said zero mark may be selectively set at a distance equal to the nominal length of X plus Y above the lower end of said foot portion so that in use of said apparatus the zero mark of said level rod corresponds to the height of said level support;

said level rod also includes a plurality of selectively adjustable sections and means for releasably securing each of said sections to another of said sections adjacent thereto and means for releasably securing said leg member to the lowest one of said sections when said level rod is held in generally vertical position for use;

said lowest one of said sections having said graduations on a front surface with a back surface behind said front surface wherein said means for releasably securing said leg member comprise a plurality of fixed threaded studs extending from said back surface and nuts threaded on said studs, and said leg member is provided with an elongate slot through which said studs extend to facilitate sliding adjustment between said leg member and said lowest one of said sections when said nuts are loosened on said threaded studs;

said leg member comprises a relatively narrow elongate segment in contact with said back surface of said lowest one of said sections, and a relatively wide short segment at the longer end thereof extending down to said foot portion, said relatively wide short segment having a generally horizontal abutment to limit upward adjustment of said leg member with respect to said lowest one of said sections whereby said foot portion will be below the lower end of said lowest end of said section by a distance Y;

said back surface is provided with vertical graduations in centimeters of downwardly increasing magnitude and said leg member includes indicia means to show the amount by which said leg member and said lowest one of said sections are extended with respect to each other, and said principal and subordinate dimensions are in terms of meters and centimeters, respectively; and said lowest one of said sections comprises a pair of parallel grooves on said back surface with each of said grooves extending upwardly from the lower end of said lowest one of said sections to terminate at a blind end adjacent the upper end of said lowest one of said sections.

3. The apparatus as defined in claim 1 or 2, wherein said leg member has a channel cross-section with elongate flanges disposed in said grooves for sliding movement therein when said nuts are loosened on said studs.

4. Apparatus for use in setting and checking grades in construction of roads, parking lots, buildings, or the like comprising a level support in combination with a level rod wherein said level support has a nominal length of X plus Y, for example, said level rod includes a zero mark above which are plus (+) graduations in terms of a principal dimension and a subordinate dimension and below which are minus (−) graduations in terms of said principal and subordinate dimensions down to a length of X and a leg member adjustably secured to said rod, said leg member having a foot portion extending below the lower end of said rod, said leg member being adjustable so that said foot portion may be selectively set to extend below the lower end of said rod for a minimum distance of Y or more as desired, whereby said zero mark may be selectively set at a distance equal to the nominal length of X plus Y above the lower end of said foot portion so that in use of said apparatus the zero mark of said level rod corresponds to the height of said level support;

said level rod also includes a plurality of selectively adjustable sections and means for releasably securing each of said sections to another of said sections adjacent thereto and means for releasably securing said leg member to the lowest one of said sections when said level rod is held in generally vertical position for use;

said lowest one of said sections having said graduations on a front surface with a back surface behind said front surface wherein said means for releasably securing said leg member comprise a plurality of fixed threaded studs extending from said back surface and nuts threaded on said studs, and said leg member is provided with an elongate slot through which said studs extend to facilitate sliding adjustment between said leg member and said lowest one of said sections when said nuts are loosened on said threaded studs; and said lowest one of said sections comprises a pair of parallel grooves on said back surface, each of said grooves extending upwardly from the lower end of said lowest one of said sections to terminate at a blind end adjacent the upper end of said lowest one of said sections.

5. The apparatus as defined in claim 4, wherein said leg member has a channel cross-section with elongate flanges disposed in said grooves for sliding movement therein when said nuts are loosened on said studs.

* * * * *